(12) United States Patent
Avera

(10) Patent No.: US 8,862,440 B2
(45) Date of Patent: *Oct. 14, 2014

(54) METHOD FOR FORECASTING A MAGNETIC OR ELECTRICAL ENVIRONMENT FROM AN OCEAN VOLUME

(75) Inventor: William Avera, Slidell, LA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 316 days.

This patent is subject to a terminal disclaimer.

(21) Appl. No.: 13/346,107

(22) Filed: Jan. 9, 2012

(65) Prior Publication Data
US 2012/0109601 A1 May 3, 2012

Related U.S. Application Data

(63) Continuation of application No. 12/400,230, filed on Mar. 9, 2009, now Pat. No. 8,117,150.

(51) Int. Cl.
 *G06F 17/16* (2006.01)
 *G01V 11/00* (2006.01)
(52) U.S. Cl.
 CPC .................................. *G01V 11/00* (2013.01)
 USPC ........................................................... 703/2
(58) Field of Classification Search
 None
 See application file for complete search history.

(56) References Cited

U.S. PATENT DOCUMENTS

| | | | |
|---|---|---|---|
| 3,738,164 | A | 6/1973 | Sanford et al. |
| 7,705,599 | B2 | 4/2010 | Strack et al. |
| 8,117,150 | B1 | 2/2012 | Avera |
| 2008/0284441 | A1 | 11/2008 | Kowalczyk et al. |
| 2009/0006053 | A1 * | 1/2009 | Carazzone et al. ............... 703/5 |
| 2009/0012759 | A1 * | 1/2009 | Meuris et al. ..................... 703/2 |
| 2009/0265111 | A1 | 10/2009 | Helwig et al. |

OTHER PUBLICATIONS

Matthew Rayson, "A Three Dimensional Hydrodynamic Model of Scott Reef, Western Australia", thesis of Bachelor of Engineering (Applied Ocean Science), The University of Western Australia, "http://www.uwa.edu.au/_data/assets/pdf_file/0009/1637451/Rayson_2008.pdf", 2008, pp. 1-67.*

Lilley, Hitchman, Milligan, Pedersen, "Sea-surface Observations of teh Magnetic Signals of Ocean Swells", Geophys. J. Int. 2004, pp. 565-572.*

(Continued)

*Primary Examiner* — Kakali Chaki
*Assistant Examiner* — Walter Hanchak
(74) *Attorney, Agent, or Firm* — US Naval Research Laboratory; Suresh Koshy; Kathleen Chapman

(57) ABSTRACT

A method of ocean property forecasting. The method includes generating one of a magnetic field prediction and an electric field prediction between a first observation point and a plurality of uniform ocean cells by generating a vector sum of magnetic field contributions from a plurality of magnetic field vectors and a vector sum of electric field contributions from a plurality of electric field vectors, respectively. The method further includes generating one of a magnetic field forecast and an electric field forecast of the ocean volume at a second observation point in the ocean volume by re-using the magnetic field vectors and electric field vectors and scaling one of the plurality of magnetic field vectors and the plurality of electric field vectors by a plurality of tri-axial equivalent electrical currents with identical geometry to the first observation point.

14 Claims, 3 Drawing Sheets

(56) References Cited

OTHER PUBLICATIONS

Nieto-Borge, Hessner, Jarabo-Amores and Mata-Moya, "Signal-to-Noise Ratio Analysis to Estimate Ocean Wave Heights from X-band Marine Radar Image Time Series", Radar, Sonar & Navigation, IET (vol. 2 , Issue: 1 ), Feb. 2008, pp. 35-41.*

Kim, hyung Jo and Swan, Colby C., "Algorithms for Automated Meshing and Unit Cell Analysis of Periodic Composites with Hierarchical Tri-quadradtic Tetrahedral Elements", International Journal for Numerical Methods in Engineering, 2003, vol. 58: pp. 1683-1711.*

Chave, "On the Theory of Electromagnetic Induction in the Earth by Ocean Currents", Journal of Geophysical Research, vol. 88, No. B4, 1983, pp. 3531-3542.*

Marshal, Adcroft, Hill, Perelman, Heisey, "A Finite-volume, Incompressible Navier Stokes Model for Studies of the Ocean on Parallel Coimputers", Journal of Geophysical Research, vol. 102, No. C3, 1997, pp. 5753-5766.*

Kong, J. A., "Electromagnetic Fields Fue to Dipole Antennas Over Stratified Anisotropic Media", Society of Expoloration Geophysicists, Geophysics, vol. 37, No. 7, Dec. 1972, pp. 985-996.*

Ping Wang, Y. Tony Song, Yi Chao, Hongchun Zhang, "Parallel Computation of the Regional Ocean Modeling System", International Journal of High Performance Computing Applications Winter 2005 vol. 19 No. 4, 2005, pp. 375-385.*

Xiong, Z., "Electromagnetic Fields of Electric Dipoles Embedded in a Stratified Anisotropic Earth", Geophysics, vol. 54, issue 12, Dec. 1989, pp. 1643-1646.*

Chave, A.D. and Cox, C.S, Controlled Electromagnetic Sources for Measuring Electrical Conductivity Beneath the Oceans, 1. Forward Problem and Model Study, Journal of Geophysical Research, vol. 87, No. B7, pp. 5327-5338, Jul. 10, 1982.

Garrett C. and Munk, W., "Space-time scales of internal waves", Geophysical Fluid dynamics, vol. 2, pp. 225-264, 1972.

Beal, H. T. and Weaver J. T., "Calculations of Magnetic Variations Induced by Internal Ocean Wave", Journal of Geophysical Research vol. 75, No. 33, Nov. 20, 1970.

Larsen, J. C. and Sanford, T. B., "Florida Current Volume Transports From Voltage Measurements", The American Association for the Advancement of Science, Reprints Series, vol. 227, pp. 302-304, Jan. 18, 1985.

Chave, A. D., "The Magnetic Effects of Shallow Water Internal Solitions", Prepared for the Office of Navel Research under Contract N00014-85-C-0104, SIO Research Series, 86-7, Mar. 1986.

Chaillout, J. J .• Poulbot, V .. Berthier, J. and Blampain, R., "Finite Element Calculation of Electromagnetic Fields Due to Moving Sea' Water", IEEE Transactions of Magnetics, vol. 31, No. 3, D May 1995.

Gallacher, P. C., Schaferkotier, M. and Avera, W., "Non Hydrostatic Hindcasts of High Amplitude Internal Waves in the Mid-Atlantic Bight", http://www.dtic.mil/cgi-bin/GetTRDoc? AD=ADA476545, Mar. 1, 2008.

Kong, J. A., "Electromagnetic Fields Due To Dipole Antennas Over Stratified Anisotropic Media", Geophysics, vol. 37, No. 6, p. 985-996, Dec. 1972.

Xiong, Z., "Electromagnetic Fields of Electric Dipoles Embedded in a Stratified Anisotropic Earth", Geophysics, vol. 54, No. 12, p. 1643-1646, Dec. 1989.

Chave, A. D., "On the Electromagnetic Fields Induced by Oceanic Internal Waves", Journal of Geophysical Research, vol. 89, No. C6. pp. 10,519-510,528, Nov. 20, 1984.

Pertersen, R. A. and Poehls, K., "Model Spectrum of Magnetic Induction Caused by Ambientinternal Waves", Journal of Geophysical Research, vol. 87, No. C1, pp. 433-440, Jan. 20, 1982.

Podney, W., "Electromagnetic Fields Generated by Ocean Waves", Rome Air Development Center, final technical report, pp. 1-60, Aug. 1974.

Longuet-Higgins, M. S., Stern M. E. and Stommel, H., The Electrical Field Induced by Ocean Currents and Waves, With Applications to the Method of Towed Electrodes', Physcial oceanography and meteorology. vol. XIII. No. 1 Nov. 1954.

\* cited by examiner

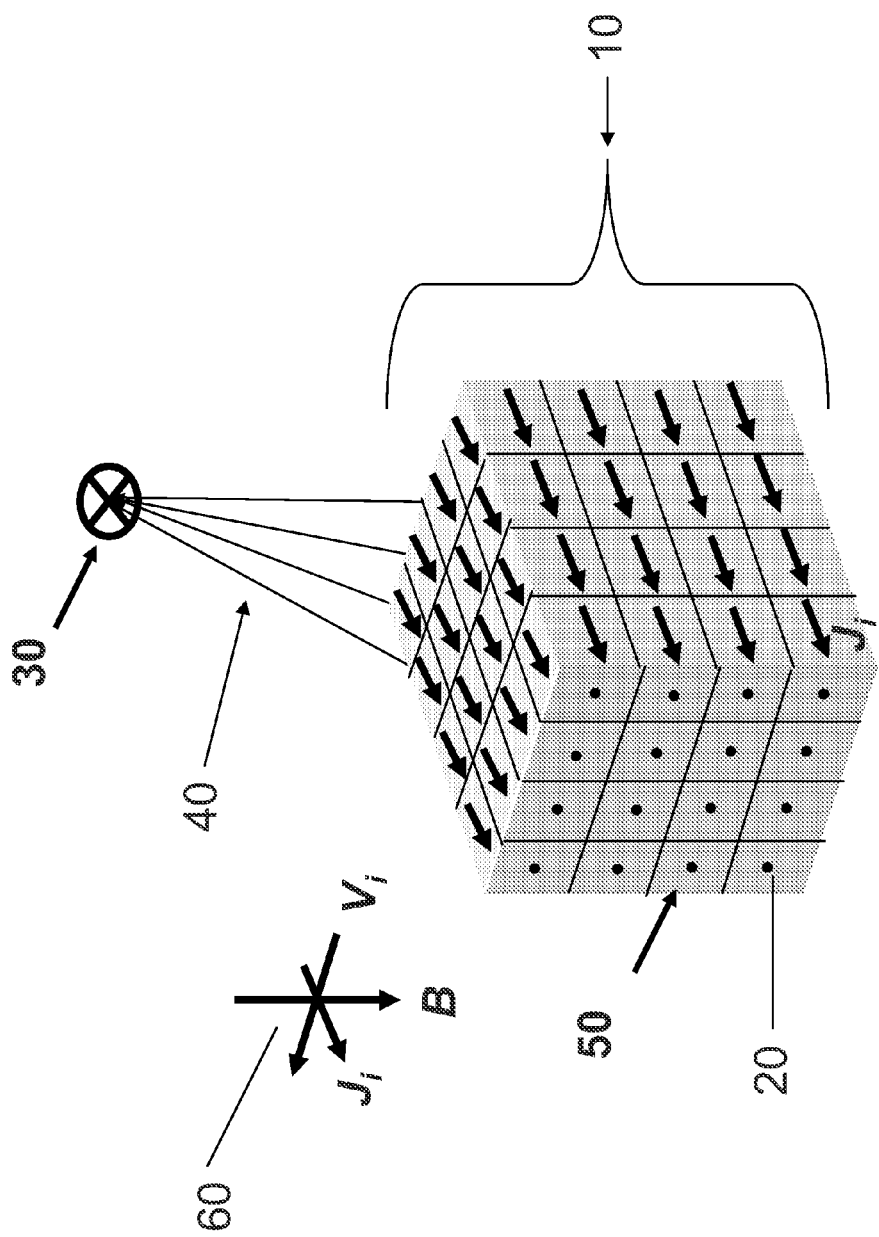

US 8,862,440 B2

METHOD FOR FORECASTING A MAGNETIC OR ELECTRICAL ENVIRONMENT FROM AN OCEAN VOLUME

CROSS-REFERENCE TO RELATED APPLICATIONS

This application is a continuation of pending U.S. patent application Ser. No. 12/400,230 entitled METHOD FOR FORECASTING A MAGNETIC OR ELECTRICAL ENVIRONMENT FROM AN OCEAN VOLUME, filed on Mar. 9, 2009, which is hereby incorporated in its entirety by reference.

BACKGROUND

This present teachings relate generally to a method for forecasting an ocean property, and, more particularly, to a method for forecasting a magnetic or electrical environment of a ocean volume having one or more currents running therethrough.

A major source of extremely low frequency electromagnetic variations in the ocean is caused by the motion of the highly conductive water through the earth's magnetic field. These hydrodynamic variations affect magnetic and electric field sensors in the frequency range below 1 Hz. One of the first studies of these fields was performed by Longuet-Higgins et al., whose investigations were concerned with electric fields induced by the steady motion of seawater. See, e.g., Longuet-Higgins, M. S., M. E. Stern, and H. Stommel, "The Electric Field Induced by Ocean Currents and Waves, With Applications to the Method of Towed Electrodes," *Papers in Physical Oceanography and Meteorology XIII, I*, Massachusetts Institute of Technology and Woods Hole Oceanographic Institution, 1954, incorporated herein by reference. Surface waves, internal waves, solitary waves, tides, and ocean currents all produce observable magnetic and electric fields. Larson and Sanford showed that the Florida Current volume transport could be determined from cable voltage measurements of an undersea cable. See, e.g., Larsen, J. C. and T. B. Sanford, "Florida Current Volume Transports from Voltage Measurements," *Science*, 227, 302-304, 1985, incorporated herein by reference.

A long period electromagnetic response of internal waves has been observed with magnetic sensors in the deep ocean, but there is little information about the character of the electric and magnetic field generated in shallow water areas. Deep water models for internal wave-induced magnetic spectra indicate that the amplitude increases with decreasing frequency.

Internal wave-induced magnetic fields for a two-layered ocean model were treated by Beal and Weaver. See, e.g., Beal, H. T. and Weaver, J. T., "Calculations of Magnetic Variations Induced by Internal Ocean Waves," *J. Geophys. Res.*, 75, no. 33, 1970, incorporated herein by reference. Podney followed with a more comprehensive treatment of internal waves for an exponentially stratified ocean with a horizontally uniform Brunt-Vaisala frequency profile. See, e.g., Podney, Walter, "Electromagnetic Fields Generated by Ocean Waves", *J. Geophys. Res.*, 80, no. 21, 1975, incorporated herein by reference. Wasylkiwskyj used a similar approach to derive solutions for the case where the Vaisala frequency profile decreases exponentially in a manner analogous to that used by Garrett and Munk (1972). See, e.g., Wasylkiwskyj, W., "Electromagnetic Fields Induced by Ocean Currents," IDA Paper P-1399, IDA: Arlington, Va., 1979, incorporated herein by reference, and Garrett, C. and W. Munk, "Space-Time Scales of Internal Waves," *J. Geophys. Fluid Dynamics*, 2, 225-264, 1972, incorporated herein by reference. The solutions derived by Wasylkiwskyj are solved for the case of an airborne sensor moving over the ocean surface. Later on Petersen and Poehls used Podney's formulation combined with the Garrett and Munk model to generate a spectral estimate of the magnetic induction. See, e.g., Petersen, R. A. and K. A. Poehls, "Model Spectrum of Magnetic Induction Caused by Ambient Internal Waves," *J. Geophys. Res.*, 87, no. C1, 433-440, 1982, incorporated herein by reference. Chave derived a somewhat more general solution for internal waves that used the Garrett and Munk wave spectra. See, e.g., Chave, A. D., "On the Electromagnetic Field Induced by Ocean Internal Waves," *J. Geophys. Res.*, 89, no. C6, 10519-10528, 1984, incorporated herein by reference. His derivation is applicable both within the ocean and on the ocean bottom and includes the effects of self and mutual induction, which should improve the model solution at low frequencies on the seafloor. He has also computed the results for a theoretical solitary internal wave. See e.g., Chave, A. D., "The Magnetic Effects of Shallow Water Internal Solutions," *Scripps Institute of Oceanography*, Reference 86-7, 1986, incorporated herein by reference.

SUMMARY

An embodiment of the present teachings includes a method of predicting magnetic field noise and electric field noise due to ocean flow hiding a target. A first observation point is provided. A three dimensional cellular model of ocean volume is provided. A plurality of earth's magnetic field vectors around the first observation point is provided. A three dimensional cellular model of ocean flow in the ocean volume is provided. A three dimensional cellular model of ocean electrical properties in the ocean volume is provided. From the three dimensional cellular model of vector ocean volume around the first observation point, the plurality of earth's magnetic field vectors around the first observation point, the plurality of three dimensional cellular model of ocean flow in the ocean volume; and the three dimensional cellular model of ocean electrical properties in the ocean volume, a plurality of uniform ocean cells between a water surface and a water bottom within the ocean volume around the first observation point with three dimensional ocean flow and with ocean electrical properties is generated. A plurality of tri-axial equivalent electrical currents corresponding to the plurality of uniform ocean cells within the ocean volume is generated. A plurality of unit tri-axial electric bipole transmitter sources corresponding to the plurality of uniform ocean cells is generated. One of a plurality of magnetic field vectors and a plurality of electric field vectors from the plurality of unit electric bipole transmitter sources is determined, wherein the water bottom and the water surface are approximated to have infinite horizontal dimensions. One of the plurality of magnetic field vectors and the plurality of electric field vectors is scaled by the plurality of corresponding tri-axial equivalent electrical currents. One of a magnetic field prediction and an electric field prediction is generated between the first observation point and the plurality of uniform ocean cells by generating a vector sum of magnetic field contributions from the plurality of magnetic field vectors and a vector sum of electric field contributions from the plurality of electric field vectors, respectively. One of a magnetic field forecast and an electric field forecast of the ocean volume is generated at a second observation point in the ocean volume by re-using the magnetic field vectors and electric field vectors and scaling one of the plurality of magnetic field vectors and the plurality of electric field vectors by the plurality of tri-axial equivalent electrical currents with identical geometry to the first observation point.

Optionally, the plurality of uniform ocean cells comprises a plurality of layers between the water bottom and the water surface.

Optionally, the plurality of uniform ocean cells are geometrically sampled such that the plurality of uniform ocean cells comprise a higher density of cells nearer to the first observation point than further away from the first observation point.

Optionally, each cell of the plurality of cells comprises a rectangular prismatic cross-section.

Optionally, the method further includes setting a detection threshold for a target based on one of the magnetic field forecast and the electric field forecast of the ocean volume at the observation point.

BRIEF DESCRIPTION OF THE DRAWINGS

FIG. 3 is a three-dimensional model of a region of an ocean volume;

DETAILED DESCRIPTION

Figure 1:
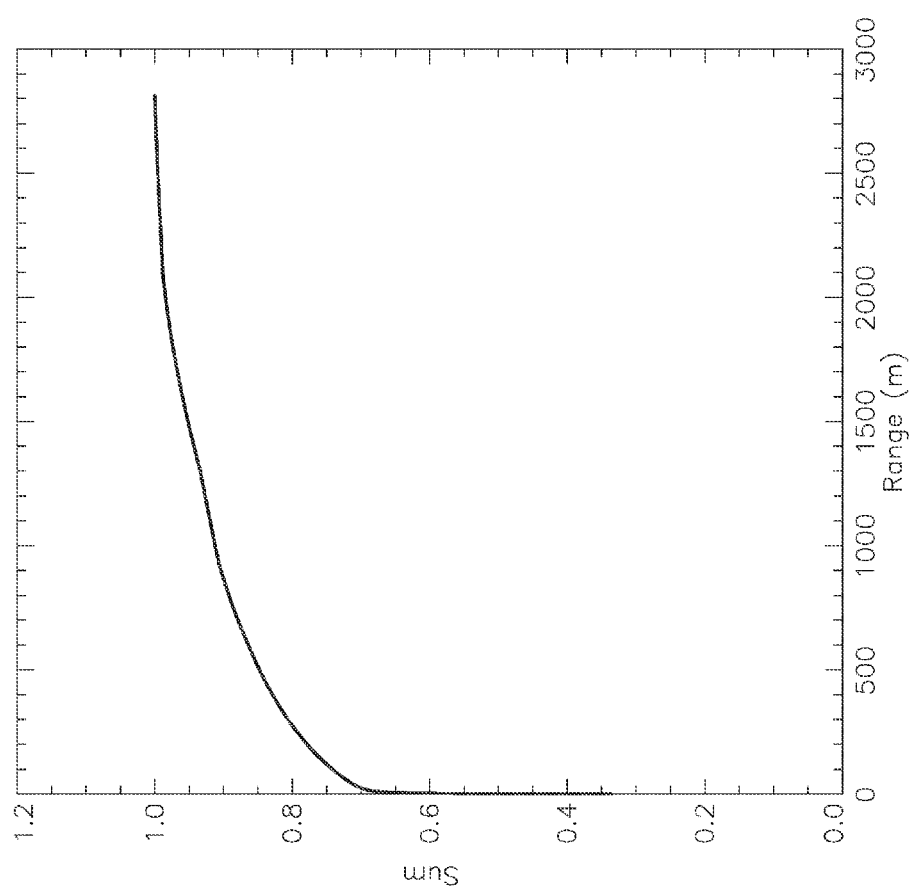
FIG. 1 is a graph of a normalized contribution to the sum of the magnetic field for bipoles spaced 1 meter apart as a function of radial range from the observation point.

An embodiment of the present teachings is described as follows. The embodiment of the present teachings includes a method of predicting magnetic field noise and electric field noise due to ocean flow hiding a target. A first observation point is provided. A three dimensional cellular model of ocean volume is provided. A plurality of earth's magnetic field vectors around the first observation point is provided. A three dimensional cellular model of ocean flow in the ocean volume is provided. A three dimensional cellular model of ocean electrical properties in the ocean volume is provided. From the three dimensional cellular model of vector ocean volume around the first observation point, the plurality of earth's magnetic field vectors around the first observation point, the plurality of three dimensional cellular model of ocean flow in the ocean volume; and the three dimensional cellular model of ocean electrical properties in the ocean volume, a plurality of uniform ocean cells between a water surface and a water bottom within the ocean volume around the first observation point with three dimensional ocean flow and with ocean electrical properties is generated. A plurality of tri-axial equivalent electrical currents corresponding to the plurality of uniform ocean cells within the ocean volume is generated. A plurality of unit tri-axial electric bipole transmitter sources corresponding to the plurality of uniform ocean cells is generated. One of a plurality of magnetic field vectors and a plurality of electric field vectors from the plurality of unit electric bipole transmitter sources is determined, wherein the water bottom and the water surface are approximated to have infinite horizontal dimensions. One of the plurality of magnetic field vectors and the plurality of electric field vectors is scaled by the plurality of corresponding tri-axial equivalent electrical currents. One of a magnetic field prediction and an electric field prediction is generated between the first observation point and the plurality of uniform ocean cells by generating a vector sum of magnetic field contributions from the plurality of magnetic field vectors and a vector sum of electric field contributions from the plurality of electric field vectors, respectively. One of a magnetic field forecast and an electric field forecast of the ocean volume is generated at a second observation point in the ocean volume by re-using the magnetic field vectors and electric field vectors and scaling one of the plurality of magnetic field vectors and the plurality of electric field vectors by the plurality of equivalent electrical currents with identical geometry to the first observation point.

Optionally, the plurality of uniform ocean cells comprises a plurality of layers between the water bottom and the water surface.

Optionally, the plurality of uniform ocean cells are geometrically sampled such that the plurality of uniform ocean cells comprise a higher density of cells nearer to the first observation point than further away from the first observation point.

Optionally, each cell of the plurality of cells comprises one of rectangular cross-section and an annular cross-section.

Optionally, the method further includes setting a detection threshold for a target based on one of the magnetic field forecast and the electric field forecast of the ocean volume at the observation point.

Another embodiment of the present teachings is described in the foundational EM model as follows. The purpose of an embodiment of the present teachings is to efficiently compute the magnetic and electric fields due to moving seawater from a model ocean. A method according to such an embodiment is an integral equation approach to model the electric and magnetic field from fluid motion of seawater. The method takes the fluid velocity and electrical conductivity for a fluid cell along with the earth's magnetic field at the location and compute the associated magnetic and electric fields at some observation point. Vector fluid velocity and conductivity values are obtained from a time step of the finite volume general circulation model like the NRL-MIT nonhydrostatic ocean model. A description of the NRL-MIT nonhydrostatic ocean model is found, for example, in C. Gallacher, Michael Schaferkotter, and Will Avera, "Nonhydrostatic Hindcasts of High Amplitude Internal Waves in the Mid-Atlantic Bight," Proceedings of the OCEANS 2007 MTS/IEEE Vancouver Conference, incorporated herein by reference.

Computation of the magnetic field due to moving seawater has usually been limited to specific cases that have an analytic theoretical solution or power spectral characterization. In this embodiment of the present teachings, a method is provided for efficiently calculating the magnetic fields using products from a finite volume ocean flow model. Advantages of this method for computing the electric and magnetic fields from moving seawater include: utilizing Navy oceanographic circulation models, accounting for complex oceanographic conditions, accounting for complex ocean bathymetric and coastal conditions, taking into account the water bottom and surface conductivity contrast; taking into account the conductivity structure within the water, approximating infinite horizontal boundaries for the water, the bottom, and air (i.e., no electromagnetic ("EM") reflections from the edge of the model). Finite difference EM models have a limited number of cells to approximate the computational edge of the model. This method is further computationally efficient because its algorithms do not require a computer to compute values all of the nodes within a model space to obtain the fields for a single point whereas finite difference and finite element EM models require computing fields at all node locations.

The following discussion of this embodiment of the present teachings will focus on the fields produced by non-linear internal ocean waves. However, it should be understood to those of ordinary skill in the art that the method can be applicable to all ocean flow dynamics.

The electro-magnetic ("EM") model computations for this embodiment of the present teachings are dependent on the velocity and conductivity properties derived from the NRL-MIT nonhydrostatic model. The hydrodynamic model solves for the finite volume representation of the fluid motion as a function of time and space. At each time step, there are three orthogonal velocity components associated with the fluid motion for each fluid volume element. From these velocity components, the effective electromotive force across a volume element can be computed using Eq. (1), $$\overline{E}_i = \overline{V}_i \times \overline{B}. \tag{1}$$

Where $\overline{B}$ is the vector magnetic field of the Earth, $\overline{V}_i$ is the vector velocity of the $i^{th}$ water volume element and $\overline{E}_i$ is the vector electric field across the $i^{th}$ volume element. An overstrike line indicates a vector quantity. The current density $\overline{J}_i$ (A/m$^2$) for the $i^{th}$ fluid element with conductivity $\sigma_i$ is then, $$\overline{J}_i = \sigma_i (\overline{V}_i \times \overline{B}). \tag{2}$$

Several approximations are used to simplify the hydrodynamic model fluid element for the EM model computations. The magnetic field generated by the flow is very small compared to the Earth's main field and is assumed to not modify the primary field $\overline{B}$. No magnetic field gradients are included such that the Earth's field is assumed to be constant across the model domain. In addition, due to the limited size of the finite volume model, assumptions about the conductivity and velocity at the horizontal boundaries are required to properly compute the EM fields near the boundaries.

For each fluid element of the model, there is an electric current across the element that is associated with the electric field generated by the fluid motion. Because the velocity is known during a time step of the hydrodynamic model, the electric current across the fluid element during the time step can be computed. In order to model the electric and magnetic fields for any field observation (measurement) point outside the fluid element, the algorithm will compute the fields based on the electric current from each fluid element near the observation point and sum the vector fields together from all the fluid elements. In this context, 'near' the observation point will be quantified later in the discussion.

To simplify the EM model and capitalize on existing well-tested computational techniques and software, (e.g., Kong, J. A., "Electromagnetic Fields Due to Dipole Antennas Over Stratified Anisotropic Media," *Geophysics*, 37, n. 6, 985-986, December 1972, incorporated herein by reference, and Xiong, Z., "Electromagnetic fields of electric dipoles embedded in a stratified anisotropic earth," *Geophysics*, 54, no. 12, 1643-1646, December 1989, incorporated herein by reference), a bipole representation of the electric current in the fluid element is used to compute the EM fields. While this is not truly representative of the electric geometry for a square fluid element, the bipole representation is found to be a very good approximation provided that the current is small and scaled appropriately. In addition, problems with singularities are avoided by introducing the bipole representation at the center of the fluid elements and restricting field observation points to the edges of the fluid elements.

In EM model calculations, the fluid element can be replaced with three orthogonal bipole line sources each having an equivalent bipole moment ($\overline{M}$) associated with the vector current density for the fluid element, $$\overline{M} = \int \overline{J} dv \tag{3}$$

Then for a rectangular fluid element having dimensions of $\Delta x \Delta y \Delta z$ for which the current density is constant, the equivalent moment would be:

$$\overline{M} = \overline{J} \Delta x \Delta y \Delta z. \tag{4}$$

Each bipole line source is positioned at the center of the fluid element and having a length $\Delta d$ equal to the related dimension of the fluid element. Then, for a bipole of length $\Delta d$ and current I, $$\overline{M}_i = \overline{I}_i \Delta d. \tag{5}$$

Thus, for a bipole representation of the fluid element, the current $I_i$ in the equivalent bipole should be scaled to, $$\overline{J}_i \Delta x \Delta y \Delta z = \overline{I}_i \Delta d \tag{6}$$

And solving for the tri-axial (vector) equivalent electric current $I_i$, $$\overline{I}_i = \frac{\overline{J}_i \Delta x \Delta y \Delta z}{\Delta d} \tag{7}$$

The EM computation model described here uses an integral equation solution for a bipole source in a layered medium to solve for the EM fields at an observation point. The integral equation technique is described by Kong (1972) and the computational technique is described by Xiong (1989).

Using this technique reduces the computational load because the primary field and reflections of the sources due to the horizontal layers (e.g., the surface of water, the water bottom, or the water subbottom) are included in the solution. As a result, solutions need only be computed for the lateral extent of the sources within the water associated with the fluid motion and only to the extent that they have a significant contribution at the field observation point. The model configuration (e.g., air, water, bottom) described herein has a water thickness much less than the horizontal extent of the model, and no motion induced sources exist in the air or the bottom. For this configuration, it is more efficient to compute the fields at an observation point from fluid elements in layers, and the layers are summed together to compute the resulting vector field at the observation point. In this sum of sources throughout the water volume, the current in each bipole source in each fluid element is scaled by Eq. (7) for the hydrodynamic parameters of that element.

The integral equation model takes advantage of the numerical computer codes that have been developed and thoroughly tested as described above in the Kong (1972) and the Xiong (1989) references. These computer codes use a Green's function approach to solve for the electric and magnetic fields in a layered half space. For an observation point P, at a distance r from the origin, the magnetic ($\overline{H}$) and electric ($\overline{E}$) field due to a current source $\overline{J}$ at a distance $r_i$ can be computed using the integral equation technique for a layered media. If the current source is selected to be unity (1 A/m$^2$), then the resulting fields $\overline{H}_1(r_p:r_i)$ and $\overline{E}_1(r_p:r_i)$ represent a scaling function for the field contributions at point P from the bipole source at $r_i$. Combining with Eq. (7), the fields at point P from the bipole source at $r_i$ are then $$\overline{H}_i(r_p) = \overline{H}_1(r_p:r_i) \cdot \overline{I}_i, \overline{E}_i(r_p) = \overline{E}_1(r_p:r_i) \cdot \overline{I}_i \tag{8}$$

The magnetic and electric field at point P is then the vector sum of all the field contributions from all the bipole sources.

$$\overline{H}(r_P) = \sum_{i=1}^{N} \overline{H}_i(r_P:r_i), \overline{E}(r_P) = \sum_{i=1}^{N} \overline{E}_i(r_P:r_i) \qquad (9)$$

The contributions to the vector sum in Eq. (9) come from all the source current elements within the water volume. However, the magnetic and electric field contribution from any particular bipole decreases rapidly with distance from the source. As a result, it is adequate to only sum the contributions within some region about the observation point. If the source contributions are coherent over large scales, then the sum in Eq. (9) will increase with the distance (i.e., with increased volume) away from the observation point and will converge to a finite value. An example of this is shown in FIG. 1 for the summed magnitude relative to a uniform grid of coherent current sources plotted as a function of distance from the observation point. In these terms, coherence can be related to the scale of the fluid flow phenomena in the model. For example, tidal flow would have scales much larger than the submesoscale ocean model and would contribute in a coherent way to the fields at an observation point. So, in general, the fields from a particular ocean flow can be considered as coherent for scales less than the scale of the ocean feature. For internal wave features with scales on the order of a kilometer or less, the sum would be roughly coherent at scales less than a kilometer and less coherent for larger scales. This affects the computations by providing some guidelines as to how large an aerial coverage the sum in Eq. (9) needs to cover to get an accurate answer. Based on the observed convergence in FIG. 1 and consideration for the scales of the ocean features of interest, the sum in Eq. (9) should encompass two kilometers or more from the observation point.

As previously discussed, the focus of this embodiment of the present teachings is to calculate fields for submesoscale internal ocean flow (e.g., 10 kilometers or less) and particularly for the case where the water depth is significantly less than the horizontal scale of the model. This suggests that the aspect ratio for the model has a horizontal dimension that is on the order of ten times or more relative to the vertical dimension. Taking into consideration the previous discussion and that the water is in general less than 1 kilometer deep, then the sum in Eq. (9) should include the entire water column vertical dimension. It is computationally efficient to construct the sum in Eq. (9) as two sums: a first sum over a horizontal layer of source current elements with length scales on the order of several kilometers, and a second sum over all the layers within the water column. Breaking the computations into two sums simplifies the complexity of determining sample points for the sum. Equation (9) then becomes, $$\overline{H}(r_P) = \sum_{j=1}^{Nv} \sum_{i=1}^{Nh} \overline{H}_{ij}(r_P:r_{ij}), \overline{E}(r_P) = \sum_{j=1}^{Nv} \sum_{i=1}^{Nh} \overline{E}_{ij}(r_P:r_{ij}) \qquad (10)$$

where Nh is the number of source current elements summed within the horizontal layer and Nv is the number of horizontal layers summed within the vertical water column. $H_{ij}$ are the respective contributions for the individual current elements (i) within each layer and for the layers (j) representing the water volume. The summation is now discretized so that the current element contributions within each layer can be spaced more efficiently to reduce the computational load.

Figure 2:
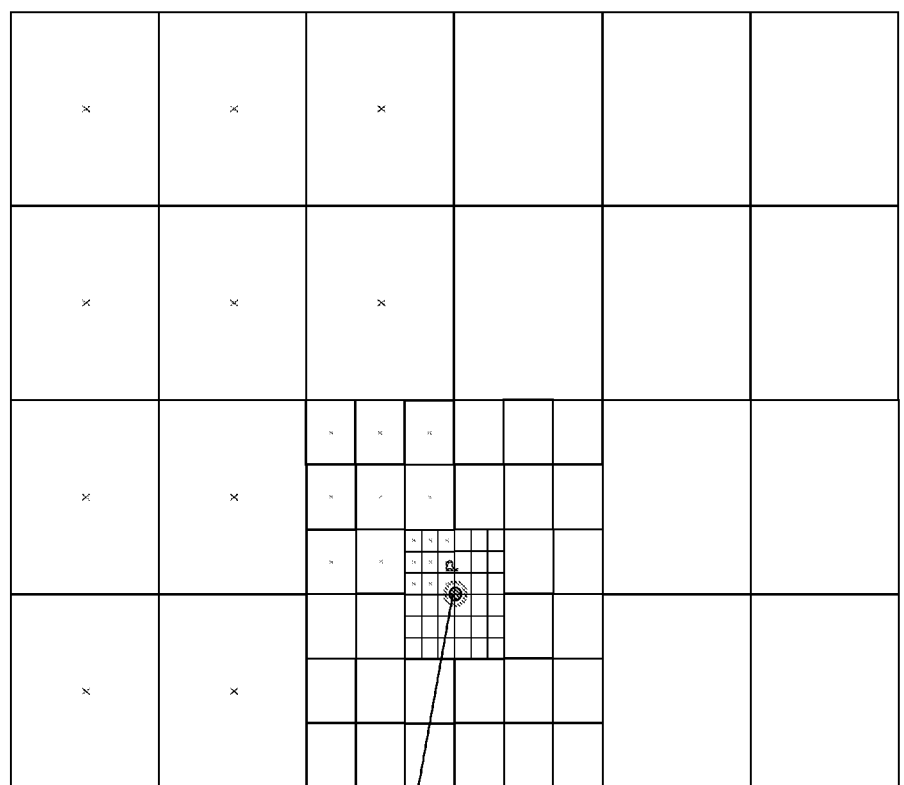
FIG. 2 is a map view for the geometric sampling scheme in a horizontal layer for source current elements where elements are spaced most densely near an observation point P. In this illustrative case, the geometric factor is three and there are three expansions or levels of increasing area size shown.

To reduce the number of computations while maintaining the accuracy, the source current elements can be spaced using a geometric sampling density scheme within each layer. This samples the volume close to the source at every one meter cube fluid element cell and efficiently reduces the sampling density further away from the observation point in a way to completely fill the area of the layer without overlap. The geometric scheme chosen computes the X and Y positions for the center point of each cubic cell within a layer as a function of an integer counter. The positions are computed using, $$Pxy_{nj} = \frac{G^n}{2} + G^n \cdot j \qquad (11)$$

where $Pxy_{nj}$ is the x or y position of the source current element relative to the observation point P, and identified in FIG. 2 as reference number 70. G is the geometric factor, n is the number of expansions or levels, and j is an integer counter with values from j=0 to j=n−1. G must be an odd number for the source current elements to always fall in the center of a cell. An example of a geometric sampling density scheme 50 is shown by way of example in FIG. 2 for the case for G=3 and n=3.

An illustrative application of the foundational EM model discussed above is fairly straightforward. Once the fields are computed with Eq. (8), then the fields are summed together with Eq. (10) to generate the resulting field at point P. Most of the computational work is done in computing the $\overline{H}_1(r_p:r_i)$ and $\overline{E}_1(r_p:r_i)$ scaling functions in Eq. (8) and in prepping the oceanographic model parameters (e.g., vector velocity and conductivity) into uniform cells of similar size. An illustrative example of an ocean volume 10 of the oceanographic fluid cells of uniform size is given in FIG. 3. Fluid cell 50 is an illustrative oceanographic fluid cell in ocean volume 10. Ocean volume 10 includes a region of ocean volume subdivided into uniform fluid cells within which an arrow is shown representing one of three perpendicular bipole sources for each fluid cell. A dot 20 on the face of each fluid cells of ocean volume 10 is the projection of the bipole arrow onto the face of the visible fluid cells. An illustrative field measurement (i.e., observation) point 30 is also shown. Field measurement point 30 is a point where the magnetic and/or electric field prediction for the ocean volume 10 is desired. The lines 40 emanating from the ocean volume 10 to the field measurement point reference 30 represent the magnetic and/or electric field contribution from each of the bipoles in each of the cells for the ocean volume 10. For a given ocean volume 10, the relationship between the water velocity for a given fluid cell, the electric current field for the given fluid cell, and the magnetic field for the given fluid cell is shown illustratively by arrows 60 adjacent to the ocean volume 10.

While it is not essential that the ocean volume to be divided into fluid cells of a uniform size, it greatly simplifies the computational bookkeeping. Accordingly, it should be understood that in alternative embodiments of the present teachings, the ocean volume is optionally divided into nonuniform fluid cells.

The functions $\overline{H}_1(r_p:r_i)$ and $\overline{E}_1(r_p:r_i)$ are computed with a layered conductivity model consisting of, for example, air, water, and ocean bottom. The water conductivity is, for example, divided into sub-layers, but the primary conductivity contrast occurs at the air and bottom interfaces. So, in an embodiment of the present teachings, choosing an average value for the water works best for computing these functions. In another embodiment of the present teachings, choosing another value for the water is also acceptable.

The function $\bar{I}_i$ in Eq. (8) is computed for each fluid element cell in the oceanographic model, described above. It is possible to evaluate the relative importance of the parameters used to calculate $\bar{I}_i$ and determine which parameters are most significant to the accuracy of the magnetic field computations. Looking at a scale analysis of the terms in Eq. (2), the conductivity σ, velocity $\bar{V}$, and earth's primary field $\bar{B}$ are the main environmental parameters. Variations in these parameters across a region of open ocean (e.g., tens of kilometers) are on the order of or less than 1 S/m out of 5 S/m for the conductivity, on the order of up to ±1 m/s (for a vector direction) for the velocity, and on the order of a few nT to 100's of nT out of 50,000 nT for the Earth's magnetic field. Based on these order of magnitude variations, the parameter variation in Eq (2) is in general on the order of:

$$\frac{\delta\sigma}{\sigma} \cong 0.2, \frac{\delta\bar{V}}{\bar{V}} \cong 2, \frac{\delta\bar{B}}{\bar{B}} \cong 0.0 \quad (12)$$

Therefore, $\bar{B}$ can be treated as a constant across the model in the source current element computations. However, σ and $\bar{V}$ are controlling variables for computing the equivalent bipole scaling currents.

In general, the hydrodynamic elements of the oceanographic model are sized for optimum computation of the vector fluid velocities. To generate a consistent fluid element size in the source current element computations, the σ and $\bar{V}$ parameters are, for example, gridded into uniform cells with a standard gridding routine to prep the ocean model. As mentioned above, other embodiments of the present teachings include nonuniform fluid cells. A grid cell size of one meter cube has proved simple to work with and is conceptually easy to check. But, of course, other grid cell sizes or shapes are consistent with the present teachings are employed in alternative embodiments of the present teachings, depending on the application desired. Once the ocean model parameters are gridded, the equivalent bipole scaling currents are computed using Eq. (7) for each cell in the model, and then Eq. (10) is computed by summing up all the contributing source elements.

Illustrative alternatives to calculate the magnetic and electric fields for moving seawater are as follows. Analytic solutions discussed above used spectral estimates for the internal wave dynamics. However, instead of using spectral estimates, a simplified Biot-Savart type calculation for the fluid elements is beneficially used in an alternative embodiment of the present teachings. (See, e.g., Frederick J. Buesche, Introduction to Physics for Scientists and Engineers, McGraw-Will, 1975, incorporated herein by reference). This simplified type of calculation ignores the distortions of the fields from the surface and bottom boundaries, which can amount to errors on the order of 20%. Instead of spectral estimates or simplified Biot-Savart type calculations, another embodiment of the present teachings employs another numerical technique using finite element electromagnetic models to calculate the fields due to moving seawater. An example of such a numerical technique is discussed in Chaillout, J. J., V. Poulbot, J. Berthier, and R. Blanpain, "Finite Element Calculation of Electromagnetic Fields Due to Moving Sea Water," *IEEE Transactions On Magnetics*, V. 31, no. 3, May 1995, incorporated herein by reference In using a finite element model, an oceanographic model is divided into three elementary models and the result of such division is combined.

For completeness, one or more of the procedures described above are optionally implemented in terms of computer-implemented methods executed on a computer or a network of computers. For example, a computer-implemented method of an embodiment of the present teachings is stored on a computer-readable medium that is executable on such a computer or network of computers. A computer-readable medium storing such a computer-implemented method according to an embodiment of the present teachings is an example of a computer program product.

Obviously, many modifications and variations of the present teachings are possible in light of the above teachings without departing from the true scope and spirit of the present teachings. It is therefore to be understood that the scope of the present teachings should be determined by referring to the following appended claims.

What is claimed is:

1. A computer-implemented method of predicting field noise due to ocean flow comprising the steps of:
   receiving a first observation point and surrounding earth magnetic field vectors;
   receiving ocean model data including ocean volume, ocean flow in the ocean volume, and ocean electrical properties in the ocean volume;
   generating a plurality of ocean cells within the ocean volume around the first observation point based on the ocean model data, the earth magnetic field vectors, the ocean flow, and the ocean electrical properties, each of the ocean cells having an ocean cell-specific ocean flow associated with the ocean cell and ocean cell-specific ocean electrical properties associated with the ocean cell;
   generating a tri-axial equivalent electrical current corresponding to each of the plurality of ocean cells based on the ocean cell-specific ocean flow associated with the ocean cell and the ocean cell-specific electrical properties associated with the ocean cell;
   generating a unit tri-axial electric bipole transmitter source corresponding to each of the plurality of ocean cells based on the ocean cell-specific ocean flow associated with the ocean cell and the ocean cell-specific electrical properties associated with the ocean cell;
   for each of the plurality of ocean cells, determining the magnetic field vectors and the electric field vectors based on the unit tri-axial electric bipole transmitter sources from each of the plurality of ocean cells to the first observation point;
   for each of the plurality of ocean cells, scaling the magnetic field vectors and the electric field vectors based on the corresponding tri-axial equivalent electric currents from the plurality of ocean cells; and
   generating a first magnetic field noise forecast and a first electric field noise forecast between the first observation point and the plurality of ocean cells based on a vector sum of magnetic field contributions from the scaled magnetic field vectors and a vector sum of electric field contributions from the scaled electric field vectors.

2. The method as in claim 1 further comprising the step of:
   generating a second magnetic field noise forecast and a second electric field noise forecast of the ocean volume at a second observation point in the ocean volume based on the magnetic field vectors and the electric field vectors and the first observation point.

3. The method according to claim 1, wherein the plurality of ocean cells comprises a plurality of layers.

4. The method according to claim 1 further comprising the step of:
geometrically sampling a higher density of the plurality of ocean cells nearer to the first observation point than farther away from the first observation point.

5. The method according to claim 1, wherein each cell of the plurality of ocean cells comprises a rectangular prismatic cross-section.

6. The method according to claim 1, further comprising the step of:
setting a detection threshold for a target based on one of the first magnetic field forecast and the first electric field forecast of the ocean volume at the first observation point.

7. A non-transitory computer-readable medium storing instructions being executed by a computer, the instructions instructing the computer to predict field noise due to ocean flow, the instructions comprising:
receiving a first observation point and surrounding magnetic field vectors;
receiving ocean model data including ocean volume, ocean flow in the ocean volume, and ocean electrical properties in the ocean volume;
generating a plurality of ocean cells within the ocean volume around the first observation point based on the ocean model data, the earth magnetic field vectors, the ocean flow, and the ocean electrical properties, each of the ocean cells having an ocean cell-specific ocean flow associated with the ocean cell and ocean cell-specific ocean electrical properties associated with the ocean cell;
generating a tri-axial equivalent electrical current corresponding to each of the plurality of ocean cells based on the ocean cell-specific ocean flow associated with the ocean cell and the ocean cell-specific electrical properties associated with the ocean cell;
generating a unit tri-axial electric bipole transmitter source corresponding to each of the plurality of ocean cells based on the ocean cell-specific ocean flow associated with the ocean cell and the ocean cell-specific electrical properties associated with the ocean cell;
for each of the plurality of ocean cells, determining the magnetic field vectors and the electric field vectors based on the unit tri-axial electric bipole transmitter sources from each of the plurality of ocean cells to the first observation point;
for each of the plurality of ocean cells, scaling the magnetic field vectors and the electric field vectors based on the corresponding tri-axial equivalent electric currents; and
generating a first magnetic field noise forecast and a first electric field noise forecast between the first observation point and the plurality of ocean cells based on a vector sum of magnetic field contributions from the scaled magnetic field vectors and a vector sum of electric field contributions from the scaled electric field vectors.

8. The computer-readable medium as in claim 7, a further instruction comprising:
generating a second magnetic field noise forecast and a second electric field noise forecast of the ocean volume at a second observation point in the ocean volume based on the magnetic field vectors and the electric field vectors and the first observation point.

9. The computer-readable medium as in claim 7 wherein the plurality of ocean cells comprises a plurality of layers.

10. The computer-readable medium as in claim 7, a further instruction comprising:
geometrically sampling a higher density of the plurality of ocean cells nearer to the first observation point than farther away from the first observation point.

11. The computer-readable medium as in claim 7, wherein each cell of the plurality of ocean cells comprises a rectangular prismatic cross-section.

12. The computer-readable medium as in claim 7, a further instruction comprising:
setting a detection threshold for a target based on one of the first magnetic field forecast and the first electric field forecast of the ocean volume at the first observation point.

13. A computer-implemented method of predicting magnetic field noise and electric field noise due to ocean flow hiding a target, the method comprising:
providing a first observation point;
providing a three dimensional model of ocean volume;
providing a plurality of earth magnetic field vectors around the first observation point;
providing a three dimensional model of ocean flow in the ocean volume;
providing a three dimensional model of ocean electrical properties in the ocean volume;
generating, from the three dimensional model of ocean volume around the first observation point, the plurality of earth magnetic field vectors around the first observation point, a three dimensional cellular model of vector ocean flow in the ocean volume; and a three dimensional cellular model of ocean electrical properties in the ocean volume, a plurality of defined ocean cells between a water surface and a water bottom within the ocean volume around the first observation point having an ocean cell-specific three dimensional ocean flow associated with the defined ocean cell and ocean cell-specific ocean electrical properties associated with the defined ocean cell;
generating a tri-axial equivalent electrical current corresponding to each of the plurality of defined ocean cells within the ocean volume based on the ocean cell-specific ocean flow associated with the defined ocean cell and the ocean cell-specific electrical properties associated with the defined ocean cell;
generating a plurality of unit tri-axial electric bipole transmitter sources corresponding to the plurality of defined ocean cells based on the ocean cell-specific ocean flow associated with the defined ocean cell and the ocean cell-specific electrical properties associated with the defined ocean cell;
for each of the plurality of defined ocean cells, determining the magnetic field vectors and the electric field vectors based on the unit electric bipole transmitter sources from the plurality of defined ocean cells, wherein the water bottom and the water surface are approximated to have infinite horizontal dimensions;
for each of the plurality of defined ocean cells, scaling the magnetic field vectors and the electric field vectors based on the corresponding tri-axial equivalent electrical currents from the plurality of defined ocean cells; and
generating one of a magnetic field prediction and an electric field prediction between the first observation point and the plurality of defined ocean cells by generating a vector sum of magnetic field contributions from the scaled magnetic field vectors and a vector sum of electric field contributions from the scaled electric field vectors, respectively.

14. The method as in claim 13 further comprising the step of:

generating one of a magnetic field forecast and an electric field forecast of the ocean volume at a second observation point in the ocean volume by re-using the magnetic field vectors and electric field vectors and scaling one of the plurality of magnetic field vectors and the plurality of electric field vectors by the plurality of tri-axial equivalent electrical currents with identical geometry to the first observation point.

\* \* \* \* \*